United States Patent [19]

Tsukada

[11] 3,840,142

[45] Oct. 8, 1974

[54] MINIATURE TAPE CARTRIDGES

[75] Inventor: Haruo Tsukada, Yokohama, Japan

[73] Assignee: Victor Company of Japan Limited, Yokohama, Japan

[22] Filed: Feb. 23, 1973

[21] Appl. No.: 335,149

[30] Foreign Application Priority Data

Feb. 26, 1972 Japan .............................. 47-23792
Mar. 31, 1972 Japan .............................. 47-37987

[52] U.S. Cl. .............................. 220/23.4, 206/387
[51] Int. Cl. .............................. B65d 21/02
[58] Field of Search .............................. 220/232, 23.4; 242/55.19 A; 206/387

[56] References Cited

UNITED STATES PATENTS

| | | | |
|---|---|---|---|
| 3,167,458 | 1/1965 | Brazell | 220/23.4 |
| 3,381,810 | 5/1968 | Lasher et al. | 206/387 |
| 3,599,828 | 8/1971 | Conway | 220/23.4 |
| 3,661,336 | 5/1972 | Lace | 242/55.19 A |
| 3,747,754 | 7/1973 | Nix et al. | 220/23.4 |

*Primary Examiner*—William I. Price
*Assistant Examiner*—Joseph Man- Fu Moy

[57] ABSTRACT

Miniature tape cartridges for use with existing 8-track stereo tape players with a respective housing of the same dimensions in height and width as the conventional cartridge, but which is approximately half of the conventional length. The housing comprises a joining mechanism provided on the rear wall thereof to form a tongue-and-groove joint with another cartridge of the same configuration, whereby the two cartridges are firmly coupled in rear-to-rear relation to each other to provide an extended length substantially equal to the conventional length, thus facilitating insertion and retraction thereof through the slot opening of the tape player.

9 Claims, 10 Drawing Figures

MINIATURE TAPE CARTRIDGES

This invention relates generally to magnetic tape cartridges, and particularly to miniature tape cartridges of the type wherein a joining mechanism is provided to couple two miniature tape cartridges in rear-to-rear relation so that an extra length is provided to facilitate grasping one end thereof when inserting into the slot opening of a tape player.

The use of magnetic tape cartridges in automobiles and for home entertainment is wide-spread on account of their easy insertion-to-play operation. With the increase in the number of tape cartridges, there has arisen a problem in that a relatively large amount of space is required to store the cartridges when not in use. This problem is particularly important in automobiles where space is very limited. Reducing the conventional cartridge length would solve the space problem. However, the rear end portion of the cartridge terminates somewhere inwardly of the front wall of the tape player. This necessitate the provision of means for providing an extra length to the cartridge. U.S. Pat. No. 3,661,336 describes a miniature tape cartridge having a housing which has an extensible arm pivoted at one end of the rear wall thereof. Also disclosed in this patent is a U-shaped member which is normally retracted in the housing and slidably extensible when the cartridge is inserted into the tape player. However, the provision of such extensible members would add to the complexity of the housing structure, and for the user it would be sometimes inconvenient to use such extensible means.

Accordingly, it is an object of the present invention to provide an improved miniature tape cartridge housing which permits coupling with another cartridge of the same construction in rear-to-rear relation to provide an extended length so as to facilitate insertion and retraction of the cartridge.

Another object of the present invention is to provide a joining mechanism for coupling two miniature tape cartridges of the same construction which is easy to manufacture and simple to use.

A further object of the present invention is to provide a tongue-and-groove joint for coupling two miniature tape cartridge housings which are provided with tongue and groove portions at the opposite ends of the rear wall thereof, whereby a tongue of one cartridge is meshed with a groove of the other cartridge by slidably moving the cartridges along the rear walls in opposite directions.

A still further object of the present invention is to provide means for coupling two miniature tape cartridges whereby users are given many and varied selections and combinations of desired recordings.

Briefly described, the miniature tape cartridge according to the present invention includes a housing of the same dimensions in height and width as the conventional type, but shorter in length than the latter. The reduced cartridge size will give an extra space for storing additional numbers of miniature tape cartridges, but it is necessary to permit users to grasp one end of the cartridge for insertion and retraction thereof through the slot opening of a tape player since the rear end of the cartridge housing terminates somewhere inwardly of the front wall of the player unit. To this end, the cartridge housing is provided with a protrusion at one end of the rear end thereof and an elongate recess or groove at the other end so that when two miniature tape cartridges of identical configuration are abutted in rear-to-rear relation to each other and slidably moved along the rear end thereof in opposite directions, the two cartridges are then meshed with each other providing an extended length substantially equal to the length of the conventional cartridge. Furthermore, users can enjoy varied combinations of favorite recordings by coupling desired cartridges.

These and other features of the present invention will be more clearly understood from the following description taken in conjunction with the accompanying drawings, in which.

Figure 1:
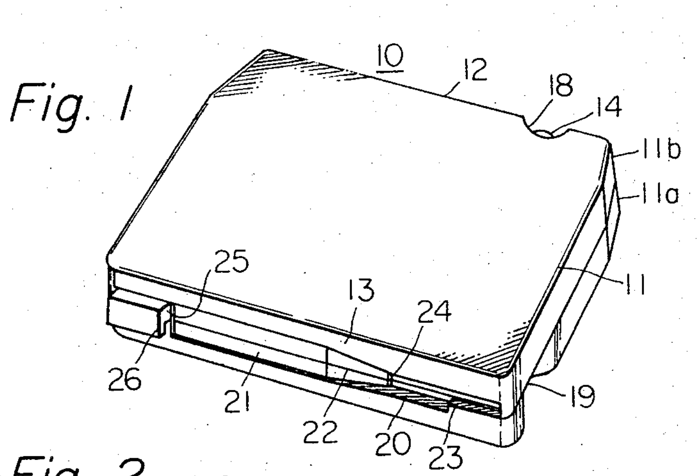
FIG. 1 is a perspective view of a miniature tape cartridge with a housing according to the present invention.
Figure 2:
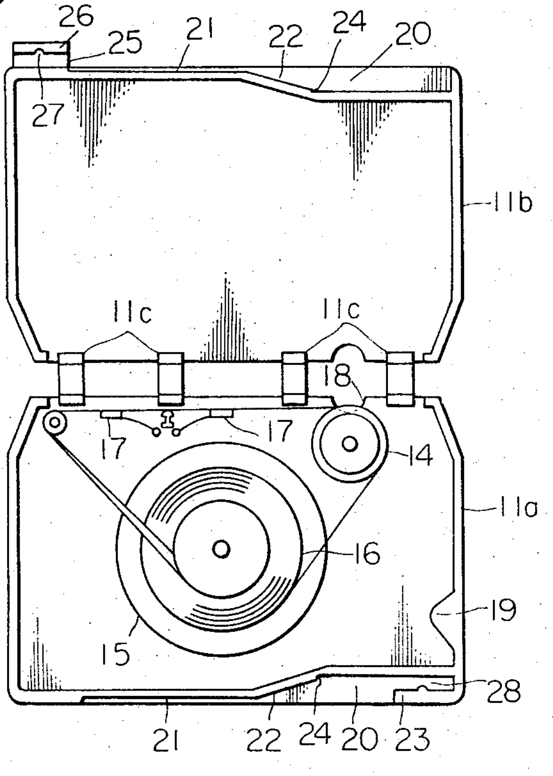
FIG. 2 is a plan view of the miniature tape cartridge, with the cartridge housing in the open position showing the inside thereof.
Figure 3:
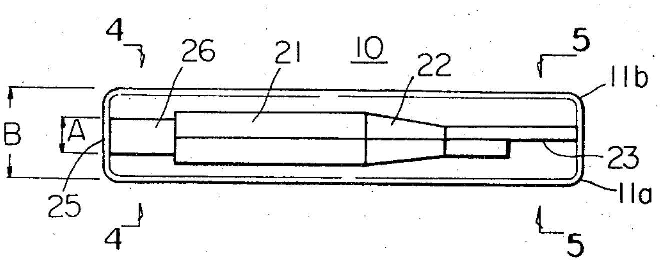
FIG. 3 is a front view of the miniature tape cartridge, showing the rear wall thereof.
Figure 4:
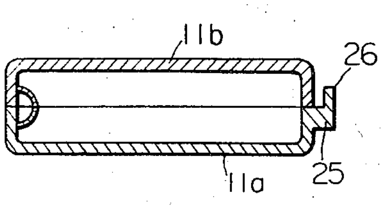
FIG. 4 is a cross-sectional view of the miniature tape cartridge taken along line 4—4 of FIG. 3.
Figure 5:
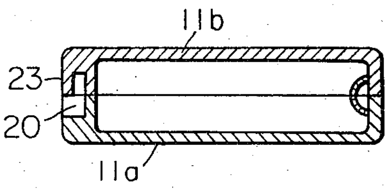
FIG. 5 is a cross-sectional view of the miniature tape cartridge taken along line 5—5 of FIG. 3.
Figure 6:
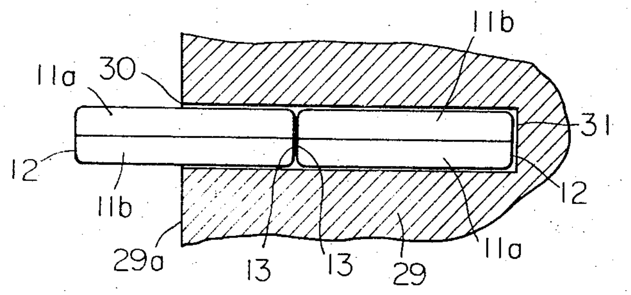
FIG. 6 is a fragmentary cross-sectional view of a cartridge-type tape player unit taken along a line normal to the front wall thereof with two of the miniature tape cartridges shown inserted into the slotted opening thereof.

Reference is now made to FIGS. 1 through 7 wherein like numerals indicate like parts throughout. In FIG. 1 a miniature tape cartridge is indicated generally at reference numeral 10. The cartridge 10 comprises a housing 11 of moulded plastic. As seen in FIG. 2, the housing 11 comprises a container 11*a* and a lid 11*b* in the flung-open position showing the interior of the cartridge. The container 11*a* and lid 11*b* are hinged to one another by means of a plurality of flexible members 11*c* to form a one-piece construction. The housing has the same dimensions in height and width as the dimensions of the conventional well-known type but having a length approximately half of the conventional length. The housing includes a front wall 12 and a rear wall 13. On the front wall 12 there is formed an opening (not shown) to permit the tape portion of the cartridge to engage the pick-up head of a tape player. The container 11a of the housing conventionally includes a pinch roller 14 disposed near the front wall 12, a rotatable disc 15, a reel of endless tape 16 and a pair of biasing pads 17. The container 11a further includes, in the conventional manner, a semi-circular cut-out portion 18 and a notch 19. On the rear wall 13 there are formed an elongate recess or groove 20 at one end thereof, a guide slot 21 wider in width than the groove 20 and disposed remote from the groove 20 and a slope portion 22 intermediate between the groove 20 and the guide slot 21. The slope portion 22 has a tapered width contiguous at the wider end thereof with the guide slot 21 and at the narrower end thereof with the groove 20. At the extreme end of the groove 20 of the rear wall 13 there is provided a flange portion 23. At the lower end of the slope portion there is formed a depression 24. At the other end of the rear wall 13 there is disposed a protrusion 25 having an enlarged portion or tongue 26 at the outer end thereof so that the protrusion has an L-shaped cross-section. On the inner side of the enlarged portion 26 there is formed a retracted portion 27. A protracted portion 28 is formed at the inner side of the flange portion 23 meshing with the retracted portion 27.

When coupling two of the miniature tape cartridges 10, the tongue 26 of one of the cartridges is inserted into the guide slot 21 of the other, and by slidably moving the cartridges along the rear walls 13 in opposite directions, the tongue is guided along the guide slot, introduced to the entrance portion of the groove 20 and advanced through the groove. As it reaches the extreme end of the groove, the tongue 26 is meshed with the flange portion 23 with the protracted portion 28 being received in the retracted portion 27, so that the two cartridges are firmly coupled with one another. The cartridges coupled in this way are capable of withstanding a reasonable force exerted in a direction normal to the rear walls in an attempt to pull them apart forcibly. Since the protracted portion 28 is received in the retracted portion 27, the cartridges ensure firm joint against careless handling. In playing operation, cartridges are paired in rear-to-rear relation as described above and inserted fully into a slot opening 30 of a tape player unit 29 (FIG. 6), with the front wall 12 of the cartridge contacting the back wall 31 and the retention roller (FIG. 10) of the player unit being engaged with the notch 19 of the cartridge 10. As apparent from FIG. 6 one of the front walls 12 of the paired cartridges remains extended outwardly of the front panel 29*a* of the player unit 29 to permit users to grasp it for retraction. The tongue-and-groove joint as described above not only permits the cartridges in pair to overcome the force exerted upon them by the retention roller of the player unit as they are retracted from the slot opening of the player, but also it permits users to handle the cartridges as if they were a single cartridge.

When removing the paired cartridges from one another, the cartridges only have to be moved in directions contrary to the directions as previously described. While the tongue 26 is retracted from the groove 20, it moves backwardly along the groove and bumps against the depression 24 as it rides on the slope portion 22. Since it often happens that when two cartridges are pulled apart with a great force exerted in the directions as referred to above, the protrusion would have such an excessive speed at which it strikes the counterpart protrusion as to cause damage to each other. Therefore, the depression would serve as a bumper to slow down the speed which would take place in such situation as described above. While in the present embodiment the depression 24 is provided at the foot of the slope portion, it may be positioned anywhere between the groove 20 and the guide slot 21. Furthermore, while in the previous description the protrusion 25 is recited as having a tongue 26, and in this embodiment the protrusion has an L-shaped cross-section, it may have any other cross-sectional shape such as a T-like cross-section.

Figures 7, 8, 9, 10:
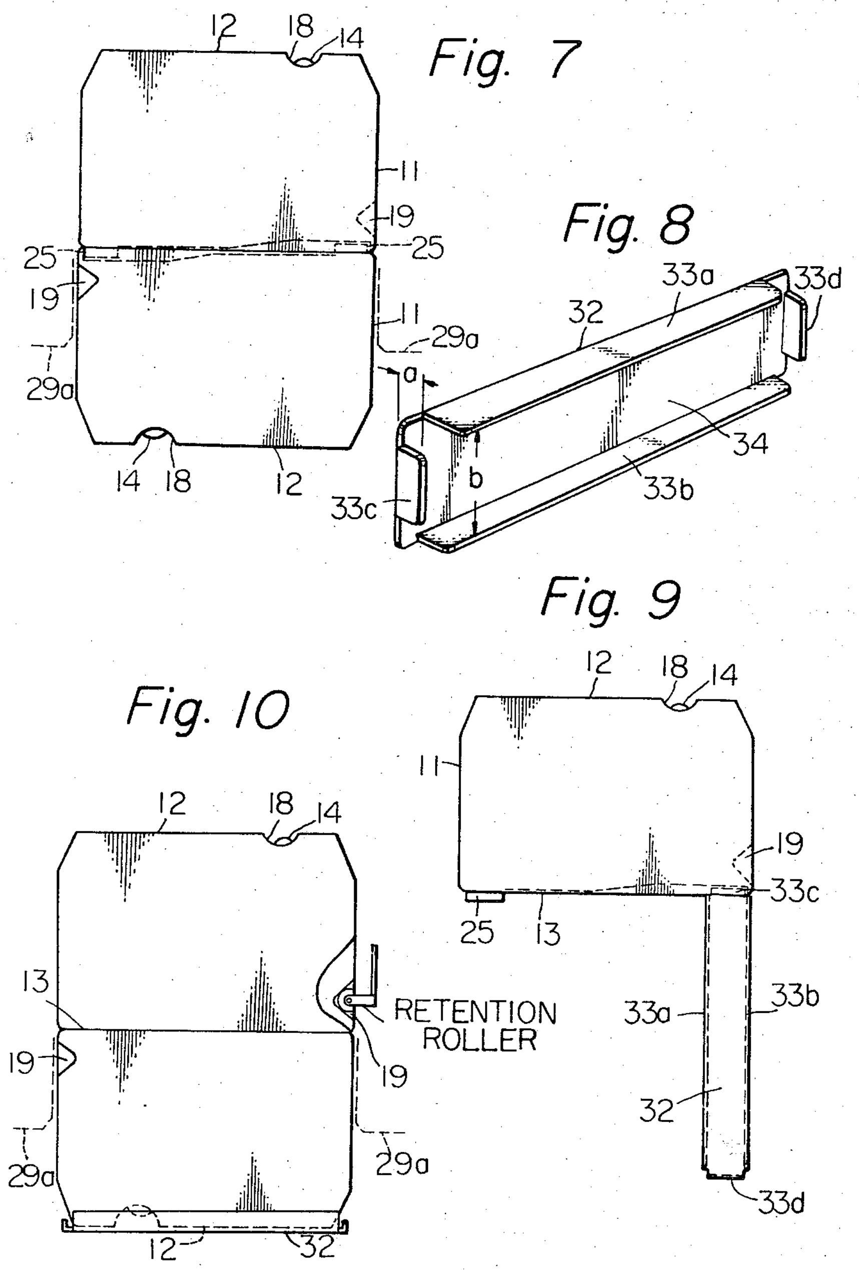
FIG. 7 is a plan view of two of the miniature tape cartridges being connected in rear-to-rear relation to each other.
FIG. 8 is a perspective view of a handle member according to the present invention.
FIG. 9 is a plan view of the handle member shown connected at one end with the miniature tape cartridge.
FIG. 10 is a plan view of the paired miniature cartridges, partly broken away, with the handle member of FIG. 8 fitted over the extended end portion thereof and in coaction with the player retention roller.

While the above description has been concerned with coupling two miniature tape cartridges in rear-to-rear relation to each other to provide an extended length in order that the insertion and retraction of the cartridges is facilitated, there may arise a need for playing only one cartridge which has been left out from forming a pair, or there is a possibility of a user inadvertently inserting only one cartridge into the tape player. Therefore, it is also necessary to provide an extra length to a cartridge which has been left out from forming a pair with another cartridge. In FIGS. 8 to 10, there is shown handle means to be used in combination with the embodiment disclosed in the previous description. Designated by reference numeral 32 is a handle member of moulded plastic which comprises lengthwise tongues 33*a* and 33*b* disposed at opposite edges thereof to define a recess 34 there-between and transverse tongues 33*c* and 33*d* disposed at opposite ends thereof. Each of the tongues 33*c* and 33*d* has a dimension *a* which is substantially equal to the dimension A of the tongue 26 of the cartridge 10 so that either of the tongues 33*c* and 33*d* is slidably received in the groove 20 of the cartridge 10 as seen in FIG. 9. Therefore, even if only one cartridge has been carelessly inserted into the tape player, the user is able to retract it by slidably engaging either of the tongues 33*c* and 33*d* into the groove 20 for retraction. Since one front wall of paired cartridges always faces outside when inserted into the player unit as can been seen from FIG. 6, the exposed tape portion of the cartridge is susceptible to possible impairment due to external causes. The recess 34 formed between the lengthwise tongues 33*a* and 33*b* has a width (dimension *b* ) slightly smaller than the height (dimension B) of the cartridge housing 11 so that the handle member 32 is fitted over the exposed front wall of the cartridge. Therefore, the handle member 32 also serves as a cover to provide protection over the exposed tape portion. In addition, the lengthwise tongues serve to give a high body strength required for inserting one single cartridge, and the transverse tongues also serve to prevent displacement of the handle member when fitted over the front wall of the cartridge. Another advantage is that if one end of the transverse tongues fails the other remains usable for insertion and retraction of a cartridge.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A joining mechanism for coupling two miniature tape cartridges together for use with a tape player having a chamber with a slot opening therein for accommodating said cartridges, said joining mechanism comprising a cartridge housing and a tongue-and-groove joint for slidably meshing each other to provide a rectangular piece in rear-to-rear relation by moving each other along the rear walls of said cartridges in opposite directions.

2. A joining mechanism as claimed in claim 1, wherein said housing comprises a protrusion disposed at one end of the rear wall of said housing and having an enlarged portion at the outer end thereof, said housing having a groove disposed at the other end of said rear wall, part of said groove having a cross-section reversely analogous to the cross-section of said protrusion.

3. A joining mechanism as claimed in claim 2, wherein said protrusion has an L-like cross-section.

4. A joining mechanism as claimed in claim 2, wherein said housing has a guide slot having a width wider than that of said groove, said guide slot extending along said rear wall.

5. A joining mechanism as claimed in claim 4, wherein said housing has a slope portion intermediate between said groove and said guide slot.

6. A joining mechanism as claimed in claim 5, wherein said slope portion has a depression at the lower end thereof to serve as a bumper against the movement of said housing when said cartridges are detached from each other.

7. A joining mechanism as claimed in claim 2, wherein said enlarged portion of said protrusion has a retracted portion and said groove has a protracted portion to be locked with said retracted portion when said two cartridges are slidably meshing each other.

8. A miniature tape cartridge for use with a tape player having a chamber with a slotted opening therein for accommodating said cartridge comprising in combination a cartridge housing, a tongue-and-groove joint at the rear wall of said housing and handle means engageable at one end thereof with said tongue-and-groove joint to provide an extra length to facilitate grasping of said cartridge.

9. A miniature tape cartridge as claimed in claim 8, wherein said handle means is an elongate member having lengthwise tongues at opposite edges thereof for defining a recess along said member and transverse tongues at opposite ends thereof for meshing at one end thereof with the groove portion of said tongue-and-groove joint, said recess being engageable with the front wall of said housing.

* * * * *